United States Patent [19]
Jarrett

[11] Patent Number: 5,432,836
[45] Date of Patent: Jul. 11, 1995

[54] INTERCHANGEABLE BASE ARRANGEMENT FOR WALL MOUNT/DESK MOUNT TELEPHONE ANSWERING DEVICE

[75] Inventor: Alastair W. Jarrett, Fullerton, Calif.

[73] Assignee: PhoneMate, Inc., Torrance, Calif.

[21] Appl. No.: 104,996

[22] Filed: Aug. 10, 1993

[51] Int. Cl.6 .............................................. H04M 1/00
[52] U.S. Cl. ..................................... 379/435; 379/436
[58] Field of Search ....................... 379/435, 436, 428

[56] References Cited

U.S. PATENT DOCUMENTS

| | | |
|---|---|---|
| D. 279,372 | 6/1985 | Baba et al. . |
| D. 284,189 | 6/1986 | Takeuchi et al. . |
| D. 303,386 | 9/1989 | Iino . |
| D. 303,964 | 10/1989 | Fukutome . |
| D. 306,730 | 3/1990 | Sugano et al. . |
| D. 307,426 | 4/1990 | Ohta et al. . |
| D. 311,378 | 10/1990 | Keck . |
| D. 312,458 | 11/1990 | Suzuki . |
| D. 316,857 | 5/1991 | Park . |
| D. 318,661 | 7/1991 | Fuqua . |
| 4,491,696 | 1/1985 | Haskins et al. . |
| 4,515,998 | 5/1985 | Pinede et al. . |
| 4,517,420 | 5/1985 | Haskins . |
| 4,741,033 | 4/1988 | Utoh et al. .................. 379/435 |
| 4,790,007 | 12/1988 | Richter et al. .................. 379/435 |
| 4,902,079 | 2/1990 | Kaplan . |

FOREIGN PATENT DOCUMENTS

| | | | |
|---|---|---|---|
| 61-181243 | 8/1986 | Japan .................................. 379/435 |
| 60-2699 | 1/9185 | Japan .................................. 379/435 |

*Primary Examiner*—James L. Dwyer
*Assistant Examiner*—Jack Chiang
*Attorney, Agent, or Firm*—Frishauf, Holtz, Goodman & Woodward

[57] ABSTRACT

A telephone device for selective mounting on a substantially horizontal or substantially vertical surface includes a housing having a top panel, and a base portion which is adapted to be alternatively mounted on a substantially horizontal and vertical surface. The base portion includes a first base member fixed on the housing, and a wedge-shaped second base member removably coupleable to the first base member. The first base member has two mutually inclined surface portions which are inclined relative to each other and which intersect and meet at an angle A, each of the two mutually inclined surface portions has substantially the same dimensions, and the mutually inclined surface portions meet at an apex which faces away from the top panel of the housing. The wedge-shaped second base member selectively engages either one of the mutually inclined surface portions of the first base member so that a flat portion of the wedge-shaped second base member is adjacent to the other of the mutually inclined surface portions of the first base member, to thereby form a substantially flat, substantially continuous mounting surface with the other of the mutually inclined surface portions of the first base member.

5 Claims, 4 Drawing Sheets

INTERCHANGEABLE BASE ARRANGEMENT FOR WALL MOUNT/DESK MOUNT TELEPHONE ANSWERING DEVICE

BACKGROUND OF THE INVENTION

This invention relates to a telephone answering device, and more particularly to a base arrangement for a telephone answering device which enables mounting the telephone answering device interchangeably on a wall or on a desk, while maintaining the front panel of the telephone answering device in the desired orientation (inclination) relative to the wall or desk for easy and convenient operability thereof.

The following discussion and description is given with respect to a telephone answering device. However, the interchangeable base arrangement of the present invention is equally applicable to ordinary telephones and ordinary answering devices (without built-in telephones), and to other telephone equipment which can be interchangeably mounted on a desk top or on a wall.

In the prior art, various mounting arrangements have been provided for interchangeably mounting a telephone set or a telephone answering device (TAD) to either a wall or a desk, as desired. Generally, the same base member is provided for both types of mounting, but the base member (or a part thereof) is oriented in different positions relative to the main housing of the telephone set in order to achieve the desired inclinations or orientations for mounting the telephone set on either a wall or on a desk top or table top. Typical examples of such prior art configurations are shown in, for example, the following U.S. patents:

U.S. Pat. No. 4,491,696;
U.S. Pat. No. 4,515,998;
U.S. Pat. No. 4,517,420;
U.S. Pat. No. 4,741,033;
U.S. Pat. No. 4,902,079;
U.S. Pat. No. 279,372;
U.S. Pat. No. 318,661.

None of the known arrangements for interchangeably mounting the telephone device to the wall or a desk top provide substantially seamless integration of the base member with the main body member of the device, and none are arranged to provide a two-part base member, one symmetrical part of which is fixed to the housing of the apparatus, and the other part of which is removably attached in different orientations to the symmetrical fixed base member. That is, none of the known arrangements provide wall mount or desk-top mount devices wherein a composite base, comprised of fixed and removable portions, has substantially the same appearance in either orientation of the removable portion.

SUMMARY OF THE INVENTION

It is an object of the present invention to provide a base arrangement including a wedge-shaped mounting bracket that is mountable on the back of a telephone answering device, telephone set, or the like (hereinafter referred to as a "telephone device"), in such a manner that the mounting bracket is positionable for selectively making the telephone device desk-top or wall mountable.

It is a further object of the present invention to provide a wedge-shaped mounting bracket which is mountable to a fixed mounting portion of a telephone device or the like, so that it is symmetrically mountable relative to the fixed mounting portion, so as to provide substantially the same general appearance when selectively arranged in a wall mount or desk-top mount configuration.

In order to attain the aforementioned objects, a telephone device for selective mounting on a substantially horizontal or substantially vertical surface comprises a housing having a top panel, and a base portion which is adapted to be alternatively mounted on a substantially horizontal and vertical surface. The base portion includes a first base member fixed on the housing, and a wedge-shaped second base member removably coupleable to the first base member.

The first base member has two mutually inclined surface portions which are inclined relative to each other and which intersect and meet at an angle A, each of the two mutually inclined surface portions has substantially the same dimensions, and the mutually inclined surface portions meet at an apex which faces away from the top panel of the housing.

The wedge-shaped second base member has engaging means for selectively engaging either one of the mutually inclined surface portions of the first base member so that a flat portion of the wedge-shaped second base member is adjacent to the other of the mutually inclined surface portions of the first base member, to thereby form a substantially flat, substantially continuous mounting surface with the other of the mutually inclined surface portions of the first base member.

The substantially flat mounting surface is at an angle to the top panel such that the top panel is inclined at a fixed angle of inclination relative to the substantially flat mounting surface when the wedge-shaped second base member is mounted on the one of the inclined surface portions of the first base member, and such that the top panel is inclined at a different fixed angle of inclination relative to the substantially flat mounting surface when the wedge-shaped second base member is mounted on the other of the inclined surface portions of the first base member.

DETAILED DESCRIPTION

The present invention will be described herein below in detail with reference to the drawings. The detailed description which follows is with respect to a telephone answering device (TAD), but the present invention is equally applicable to telephone sets and other devices which can interchangeably be mounted on a wall or on a desk top, as desired.

Figure 1:
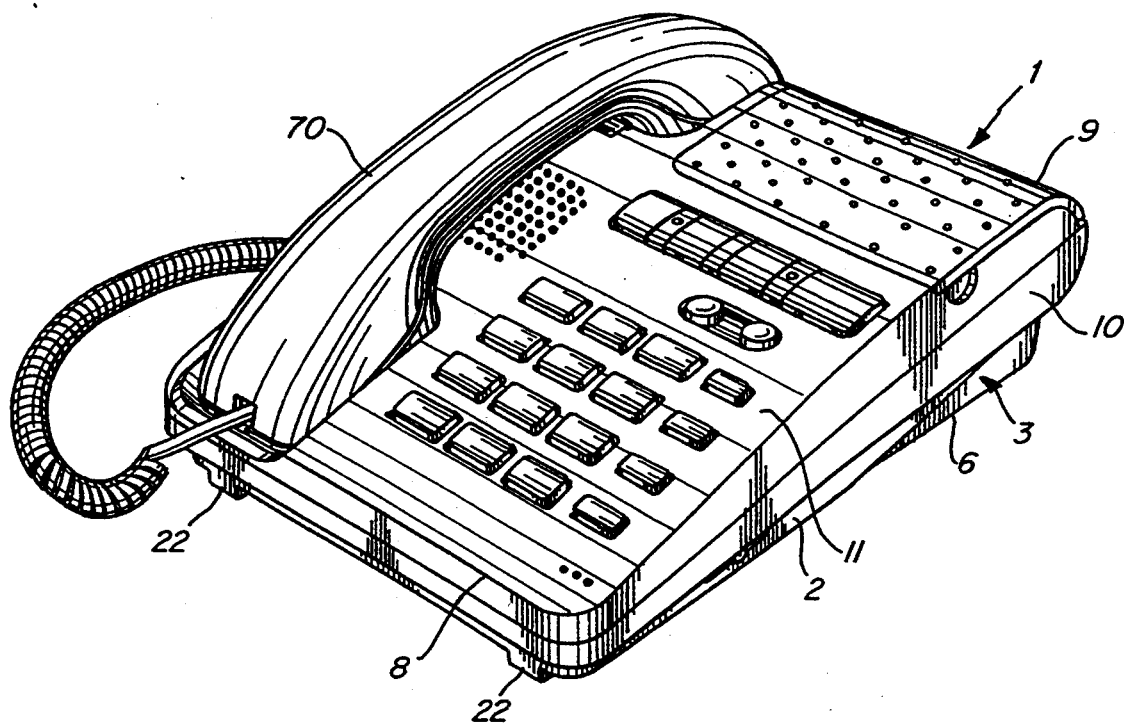
FIG. 1 is a perspective view of a telephone answering device (TAD) incorporating the improved mounting base structure of the present invention, arranged in a desk mount configuration.
Figure 2:
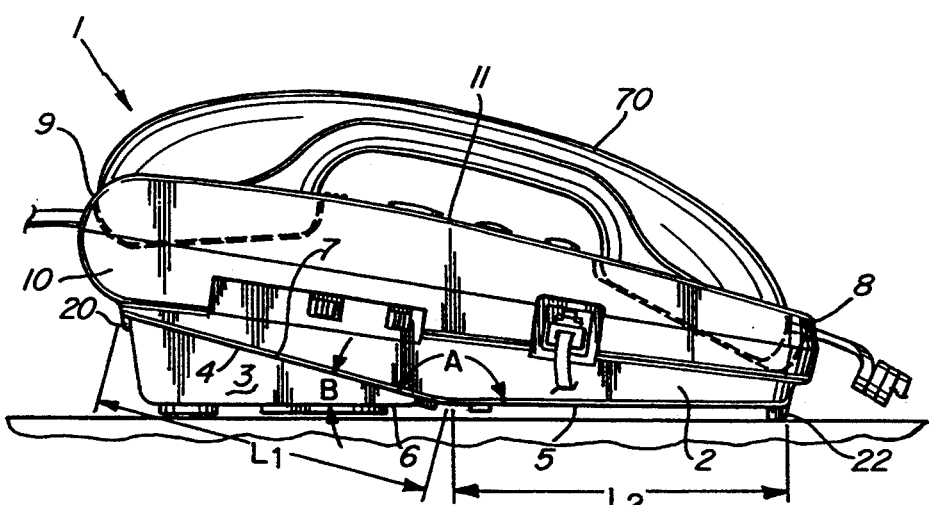
FIG. 2 is a side view of the device of FIG. 1, showing the wedge-shaped base member arranged in a desk mount configuration.

Referring to FIGS. 1 and 2, a TAD 1 has a main housing 10, a fixed base portion 2 of generally triangular profile fixed to (or integrally formed with) the main housing 10, and an interchangeable generally triangular or wedge-shaped base portion or member 3. The base portion 3 is interchangeably attached to the fixed base portion 2 in different orientations in a manner to be described later hereinbelow.

FIG. 2 shows the TAD 1 in its desk mount configuration with the upper or top end portion 9 of the TAD 1 at a higher vertical position than the bottom or lower end portion 8 thereof. This is a convenient inclination of the top panel 11 so that an operator of the device, when looking from the right side in FIG. 2, can easily view and operate the controls of the TAD mounted on the inclined top panel 11 thereof.

An important design criteria of the present invention is that the fixed base portion or member 2 has two mutually intersecting inclined surfaces 4 and 5 which intersect at an angle A (see FIG. 2). The surfaces 4 and 5 have substantially equal lengths $L_1$, $L_2$ taken in the direction from end portion 8 to end portion 9, as shown in FIG. 2. By making the lengths $L_1$ and $L_2$ substantially equal, when the wedge-shaped member 3 is selectively mounted on one of the surfaces 4 or 5, the result is that the bottom surface 6 of wedge-shaped member 3 cooperates with the other surface 5 or 4, respectively, to provide a substantially flat and stable surface of substantially the same dimension in either position (see FIGS. 2 and 3) of the wedge-shaped member 3.

The angle A between the surfaces 4 and 5 (see FIG. 2) is determined in accordance with the desired tilt or inclination of the TAD front panel 11 with reference to the wall (FIG. 3) or to a desk top (FIG. 2). The angle A is based on ergonomic and aesthetic considerations, depending upon the particular design of the housing and top operating panel of the TAD or other device with which the base member of the present invention is used. When the lengths $L_1$ and $L_2$ of surfaces 4, 5 and the angle A are fixed, they automatically determine the angle and bottom surface dimensions of the wedge member 3 and the overall bottom surface dimension of the base of the device when the wedge shaped member 3 is mounted in place.

The upper surface portion 7 of the wedge shaped member 3 has a length substantially equal to, or slightly less than $L_1$ or $L_2$, as seen in the drawings, and the upper surface portion 7 and the bottom surface 6 of the wedge shaped member 3 meet at an angle B. The sum of the angle B and the angle A, at which the surfaces 4 and 5 of the fixed base member 2 meet, moreover, is approximately 180 degrees, so that a substantially flat, substantially continuous mounting surface is formed by said surfaces 4 or 5 and 6, when the wedge shaped member 3 is mounted on the fixed base member 2.

Figure 4:
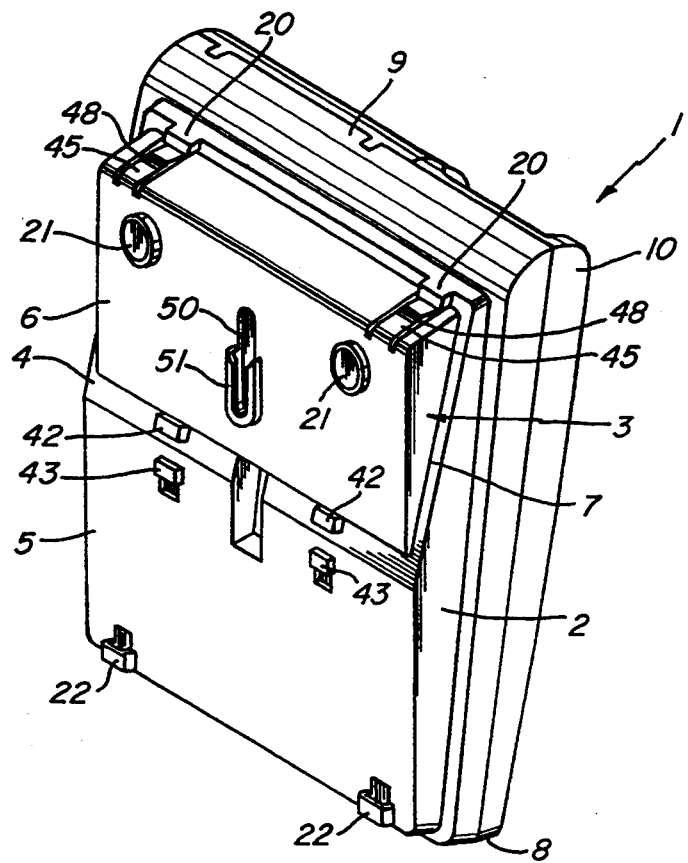
FIG. 4 is a bottom perspective view of the TAD showing the mounting of the wedge-shaped base member in the desk mount configuration.
Figure 5:
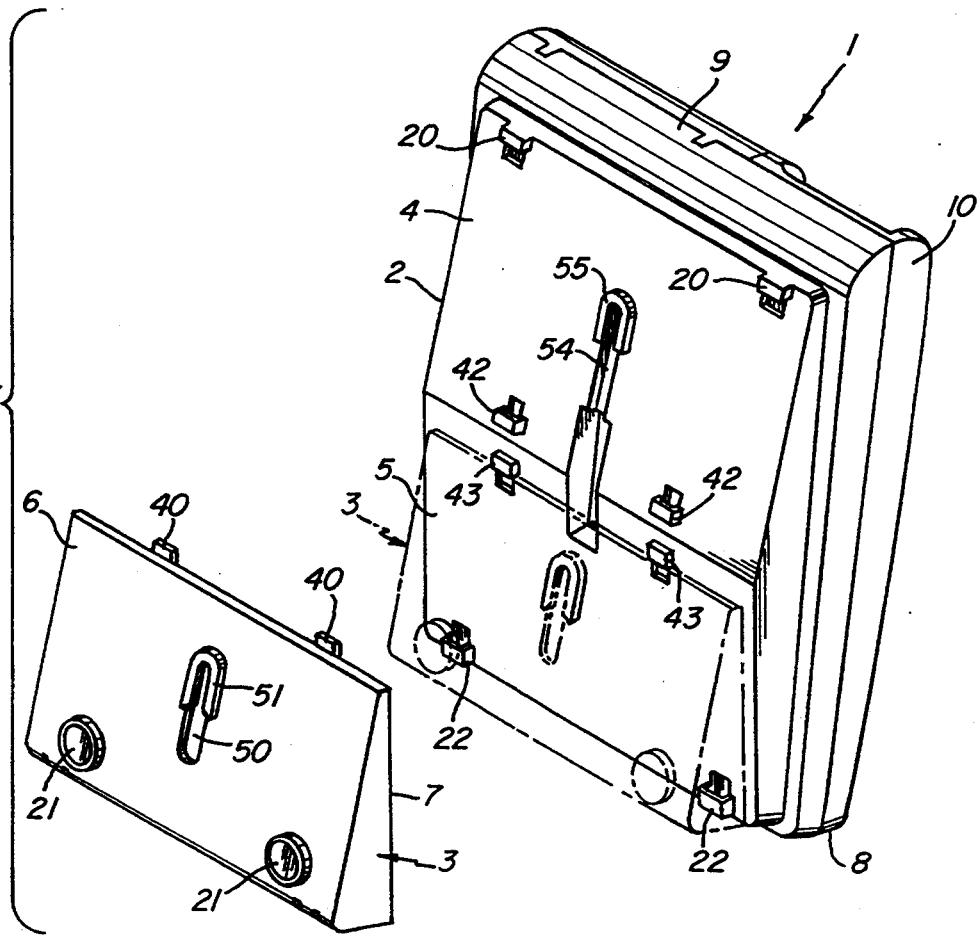
FIG. 5 is a bottom perspective view of the TAD showing the ridge-shaped base member separately from the TAD and showing in chain lines how the wedge-shaped base member is mounted to the TAD for a wall mount configuration.

As most clearly shown in FIGS. 4 and 5, the fixed base member 2 is preferably provided with raised U-shaped retaining or hook members 20, 22 (which are integrally molded with the housing in the illustrated embodiment), and the interchangeably mounted wedge-shaped base member 3 is preferably provided with resilient mounting feet 21, which mounting feet are preferably made of resilient plastic, rubber or the like. As seen in FIGS. 4 and 5, raised members 22 are provided at the forward end 8 of the TAD housing and members 20 rear end.

Figures 3, 3A:
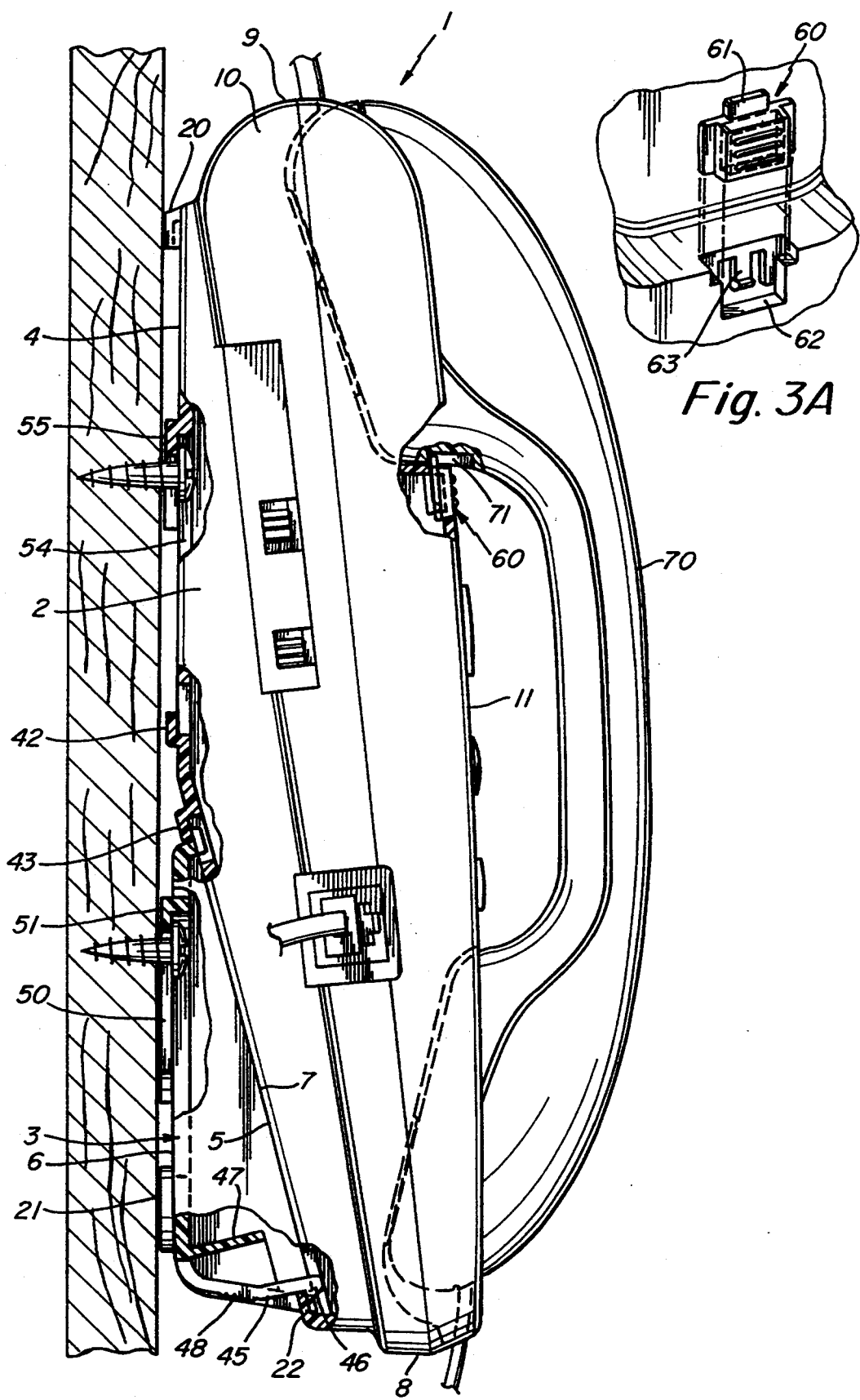
FIG. 3 is a side view, partially in cross-section, of the device of FIG. 1, with the mounting base structure arranged in the wall mount configuration, the TAD being shown mounted to a wall by means of screws.
FIG. 3A is an enlarged partial view of a tab structure for retaining the telephone handset in place when the TAD is arranged in its wall mount configuration.

When mounting the TAD on a wall, as shown in FIG. 3, the resilient feet 21 and raised members 20 bear against the wall and serve as spacers. When mounting the device on a desk top, the resilient feet 21 and raised members 22 bear against the desk top.

As seen from FIGS. 1 and 2, when the interchangeably mountable wedge-shaped base member is mounted in the desk top configuration, the member 3 and the base portion 2 together form a seamless, integrated structure which has an aesthetically pleasing appearance, which is structurally secure, and which provides the desired inclination of the top panel of the TAD. When the interchangeably mountable wedge-shaped base member 3 is interchanged in position to the wall mount configuration, as shown in FIG. 3, again a seamless integration takes place so that the resulting structure has an aesthetically pleasing appearance, has a relatively smooth, flowing design appearance, and creates a structurally secure mounting for mounting the apparatus to a wall. Moreover, since the same base member 3 is interchangeably mountable between the two positions, the apparatus is relatively inexpensive to manufacture, and very easy to use by the ultimate consumer. Since the wedge-shaped base member 3 is substantially smaller than the complete dimension of the base, the apparatus is easily manipulable by a user for proper and easy mounting thereof to the base portion 2.

Figure 6:
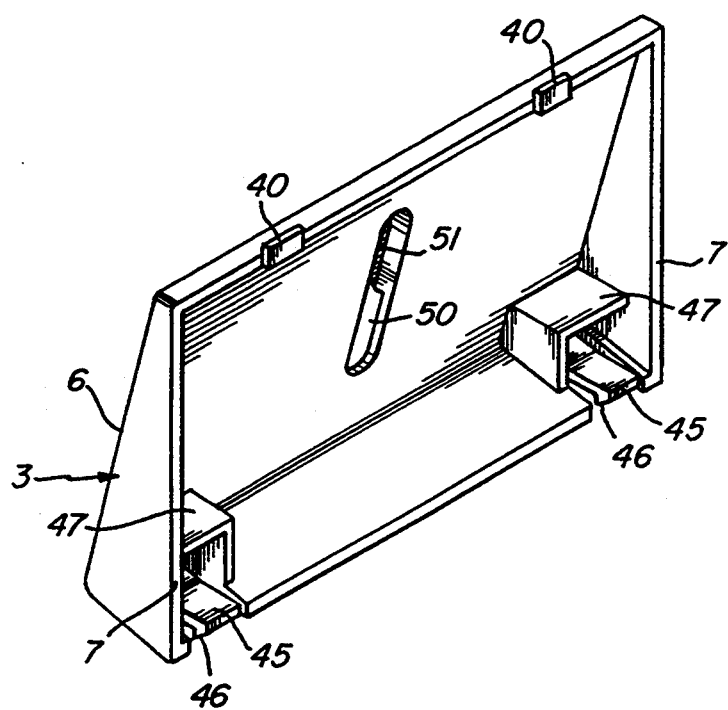
FIG. 6 is a perspective view showing the inside structure of the wedge-shaped base member according to the present invention.

It will now be described how the wedge-shaped base member 3 is conveniently interchangeably connected to the fixed base portion 2, according to the present invention. Referring to FIGS. 4-6, the wedge-shaped base member 3 is generally triangular in cross-section and has two tab members 40 which project therefrom, and which are selectively engageable under the U-shaped bridge members 42, 43 of the fixed base member 2. The U-shaped bridge members 42, 43 are integrally molded with the base member 2, as best seen in FIGS. 4 and 5. These U-shaped bridge members define receiving and engaging spaces for the tabs 40 when the wedge-shaped base member is mounted thereto. FIG. 4 shows the wedge-shaped base member engaged with bridge members 42, and FIG. 5 shows the tabs 40 engaged with U-shaped bridge members 43.

The side of the wedge-shaped base member which is opposite the tabs 40 is provided with resilient integrally molded spring members 45, which spring members 45 have hook-like portions 46 at the free ends thereof. In use, the spring members 45 resiliently bend inwardly relative to the base member 3 when installed, and the hook portions 46 engage under the raised U-shaped retaining or hook members 20, 22 of the base member 2, as best seen in FIGS. 3, 4 and 5 (see particularly the cross-sectional portion of FIG. 3). The members 20, 22 not only perform the functions of feet members for raising the base off of the surface on which the TAD is mounted, but also define openings for receiving the hook portions 46 of the resilient spring-like members 45 of the wedge-shaped base member 3. To remove the wedge-shaped base member, the user merely presses the spring-members 45 inwardly with his fingers, and then easily lifts wedge-shaped base member 3 off of the base portion 2, ready for easy installation in another orientation, as desired. A ridged area 48 (see FIGS. 3 and 4) is provided on the resilient spring-like members 45 so that the user can push in on the ridged area to release the spring-like members from the retaining hooks of the base member 2.

The wedge-shaped base member 3 is provided with a keyhole slot 50 for receiving a mounting screw (see FIG. 3), the slot 50 having a reinforcing portion 51 thereon. The base member 2 has a keyhole slot portion 54 with reinforcing 55 at the top end portion thereof. A mounting screw (see FIG. 3) is received in slot 54 for mounting the TAD to a wall or the like, as shown in FIG. 3. As shown in FIG. 6, reinforcing members 47 are provided in the interior of the hollow wedge-shaped base member 3 to reinforce the areas around the spring members 45 for a higher degree of structural integrity.

FIG. 3A shows a reversible tab 60, which retains the telephone hand piece 70 of the TAD in position on the housing when the unit is used as a wall mount TAD. FIG. 3A shows the position of the tab 60 for use as a wall mount device. When the apparatus is to be used as a desk mount TAD, the tab 60 is reversed so that its projection 61 faces downwardly, and the tab is slid into the retaining slot 62° The resilient spring-member 63 retains the tab 60 in position so that it does not inadvertently fall out. When in the wall mount position, the projecting tab 61 engages a recess 71 in the hand piece 70, as seen in FIG. 3.

While the invention has been described above with respect to a TAD, as mentioned hereinabove, the invention is equally applicable to telephone sets, answering devices and other telephone equipment, as well as to other equipment requiring selective mounting as a desk top device or a wall mount device, wherein the front panel must be inclined at different angles, depending upon the position of mounting.

I claim:

1. A telephone device for selective mounting on a substantially horizontal or substantially vertical surface, comprising:
   a housing having a top panel, and a base portion which is adapted to be selectively mounted on a substantially horizontal and vertical surface;
   said base portion including a first base member fixed on said housing, and a wedge-shaped second base member removably coupleable to said first base member;
   said first base member having two mutually inclined surface portions which are inclined relative to each other, said two mutually inclined surface portions intersecting and meeting at an angle A, each of said two mutually inclined surface portions having substantially the same dimensions, said mutually inclined surface portions meeting at an apex which faces away from said top panel of said housing; and
   said wedge-shaped second base member having engaging means for selectively engaging either one of said mutually inclined surface portions of said first base member so that a flat portion of said wedge-shaped second base member is adjacent to the other of said mutually inclined surface portions of said first base member, to thereby form a substantially flat, substantially continuous mounting surface with said other of said mutually inclined surface portions of said first base member, said substantially flat mounting surface being at an angle to said top panel such that said top panel is inclined at a fixed angle of inclination relative to said substantially flat mounting surface when the wedge-shaped second base member is mounted on said one of said inclined surface portions of said first base member, and such that said top panel is inclined at a different fixed angle of inclination relative to said substantially flat mounting surface when said wedge-shaped second base member is mounted on said other of said inclined surface portions of said first base member, both of said fixed angles of inclination being other than 0°;
   wherein said engaging means of said wedge-shaped second base member includes a plurality of projecting members which project therefrom, and said first base member includes a plurality of retaining members on each of the two mutually inclined surface portions thereof, each of said retaining members having a U-shaped portion projecting in an outward direction from said respective mutually inclined surface portions by a predetermined distance and each of said U-shaped portions defining a receiving and engaging opening for receiving and engaging respective projecting members of said wedge-shaped second base member when said wedge-shaped second base member is selectively mounted on one of said two mutually inclined surface portions of said first base member; and
   wherein said retaining members of said first base member are integrally molded with said first base member and project outwardly of the housing from the respective inclined surface portions of said first base member and have a given height relative to said inclined surface portions so as to also serve as spacers to lift said telephone device off of a mounting surface when said telephone device is selectively mounted on one of a substantially horizontal and a substantially vertical surface.

2. The telephone device according to claim 1, wherein said engaging means of said wedge-shaped second base member includes at least two resilient spring members having said projecting members thereon.

3. The telephone device according to claim 1, wherein said wedge-shaped second base member includes a foot member which is raised from the flat portion thereof to a substantially same height as said given height of said retaining members of said first base member, so as to lift said telephone device off of a mounting surface at a substantially uniform height when said telephone device is selectively mounted on one of a substantially horizontal and substantially vertical surface.

4. The telephone device according to claim 1, wherein said wedge-shaped second base member is triangular in cross-section such that a hypotenuse thereof is of substantially the same length as each of said two mutually inclined surface portions of said first base member.

5. The telephone device according to claim 4, wherein said hypotenuse of said wedge-shaped second base member is inclined from the flat portion of said wedge-shaped second base member at an angle B, and wherein the sum of said angle B and said angle A, at which said two mutually inclined surface portions of said first base member meet, is approximately 180 degrees.

* * * * *